United States Patent
Marukawa et al.

(10) Patent No.: US 7,125,268 B1
(45) Date of Patent: Oct. 24, 2006

(54) POWER SOURCE DEVICE

(75) Inventors: Shuhei Marukawa, Toyohashi (JP);
Masahiro Misu, Toyohashi (JP);
Toyohiko Eto, Toyota (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 0 days.

(21) Appl. No.: 11/400,210

(22) Filed: Apr. 10, 2006

(30) Foreign Application Priority Data

Apr. 12, 2005 (JP) .............................. 2005-114035

(51) Int. Cl.
*H01R 13/44* (2006.01)
(52) U.S. Cl. ..................................... 439/133; 439/952
(58) Field of Classification Search ................ 439/133, 439/134, 135, 500, 507, 509, 952, 911
See application file for complete search history.

(56) References Cited

U.S. PATENT DOCUMENTS

| | | | |
|---|---|---|---|
| 4,945,872 A * | 8/1990 | Embry ................ 123/146.5 B |
| 6,439,917 B1 * | 8/2002 | Tonozuka .................... 439/372 |
| 6,668,963 B1 | 12/2003 | Nada | |
| 6,817,873 B1 * | 11/2004 | Gorman ...................... 439/140 |
| 6,817,882 B1 * | 11/2004 | Bauer et al. ................ 439/347 |
| 6,902,421 B1 * | 6/2005 | Huang ........................ 439/372 |
| 6,913,473 B1 * | 7/2005 | Schmid et al. .............. 439/136 |

FOREIGN PATENT DOCUMENTS

| | | |
|---|---|---|
| EP | 1 153 787 A2 | 11/2001 |
| EP | 1 153 787 A3 | 7/2003 |
| JP | 2001-320801 | 11/2001 |

\* cited by examiner

*Primary Examiner*—Khiem Nguyen
(74) *Attorney, Agent, or Firm*—Workman Nydegger

(57) ABSTRACT

In a power source device including a battery pack, a safety switch is provided between a given pair of battery modules connected to each other. The safety switch connects and disconnects those battery modules by insertion and removal of a safety plug to/form a switch body. The power source device also includes an insertion prevention unit, such as a lock, for preventing the insertion of the safety plug to the switch body in such a manner that prevention of the insertion of the safety plug is releasable. A release operation unit is kept by a worker who removes the safety plug, so that safety of the worker against electric shock is ensured.

4 Claims, 4 Drawing Sheets

POWER SOURCE DEVICE

The present disclosure relates to subject matter contained in priority Japanese Patent Application No. 2005-114035, filed on Apr. 12, 2005, the contents of which is herein expressly incorporated by reference in its entirety.

BACKGROUND OF THE INVENTION

1. Field of the Invention

The present invention relates to a power source device including a battery pack. More particularly, the present invention relates to a power source device for ensuring worker's safety against electric shock.

2. Description of the Related Art

There are various apparatuses using a power source device including a battery pack. The battery pack has a plurality of battery modules each of which includes a single cell or a plurality of cells connected in series, and which are connected in series. Examples of the apparatuses include an electric vehicle using the battery pack as a driving power source, a hybrid vehicle using the battery pack together with an internal-combustion engine, and other various apparatuses. In such an apparatus, a power switch is provided for opening and closing a circuit for distributing power from the power source device. However, there is a problem such that, while a worker conducts maintenance work or the like with the power switch turned off, the worker may get shocked because of a mistaken power-on operation by another person.

Conventionally, a battery pack provided with a work safety device called as a "service plug" is known as a measure for safety against electric shock (see Japanese Patent Publication No. 2001-320801, for example). In the "service plug," a safety switch is provided between a given pair of battery modules in the battery pack that are connected to each other. A worker inserts and removes the "service plug" to/from a main body of the switch, thereby connecting and disconnecting the battery modules so as to open and close the power distribution circuit. Moreover, when the worker pulls out the "service plug," an interlock reed switch is turned off and a system main relay is turned off by a master controller.

By doing so, the worker can remove the "service plug" and conducts maintenance work or the like with safety. That is, even when the power-on switch is turned on by mistake, the power distribution circuit remains open. Therefore, it is possible to prevent the worker from get shocked.

However, anyone can easily insert the "service plug." Thus, there remains a problem that the worker may get shocked when another person mistakenly inserts the "service plug" while the worker is working and the worker works without noticing the insertion of the "service plug." Moreover, even if the master controller is configured to turn off the system main relay separately, the system main relay may have a trouble and may be inoperative because of welding or the like. Therefore, it is very dangerous that the "service plug" can be inserted while the worker is working.

SUMMARY OF THE INVENTION

Therefore, it is an object of the present invention to provide a power source device including a battery pack, which allows a power distribution path of the battery pack to be opened and closed by insertion and removal of a safety plug, prevents a person other than a worker or a mandator of the worker from inserting the safety plug and closing the power distribution path, and ensures work safety.

An aspect of the present invention provides a power source device including a battery pack having a plurality of battery modules each of which includes one or more cells, the modules being connected in series. The power source device includes: the battery pack; a safety switch, provided between given battery modules connected to each other, for connecting and disconnecting the given battery modules by insertion and removal of a safety plug to/from a switch body; and an insertion prevention unit for preventing the insertion of the safety plug to the switch body in such a manner that prevention of the insertion of the safety plug is releasable.

With this structure, when a worker removes the safety plug from the switch body and activates the insertion prevention unit for the safety plug, a person other than the worker and a mandator of the worker cannot release the insertion prevention unit for the safety plug. Therefore, a risk that the other person mistakenly inserts the safety plug while the worker is working is completely eliminated, thus surely preventing the worker from getting shocked while working.

It is preferable that the insertion prevention unit be composed by a key that is attachable to the switch body and prevents the insertion of the safety plug when being attached to the switch body. The key described here means a concept encompassing various sets of a lock and a key or code such as a security code for opening and closing the lock. The worker or the mandator of the worker keep the key or code for opening and closing the lock. With this structure, there is no need to provide a complicated insertion prevention mechanism in the switch body, but simply by attaching a generally used lock to the switch body the insertion of the safety plug is surely prevented. Moreover, since the worker or the mandator of the worker keeps a key or code such as a security code for opening and closing the lock, safety of the worker is ensured.

When an attachment hole is provided in the switch body, the insertion of the safety plug is prevented only by attaching the key to the attachment hole, so that the worker's safety is ensured by means of the key.

In addition, a projecting pin having an undercut portion provided on an outer surface of the switch body and an attachment plate including an elongate hole formed by a small-width portion capable of engaging with the undercut portion of the projecting pin and a large-width portion that connects with the small-width portion and serves as the key attachment hole may be provided. According to this structure, even if it is difficult or impossible to process the key attachment hole in the switch body, the attachment plate is engaged with the projecting pin so as to attach the key to the attachment plate. This structure prevents the insertion of the safety plug and ensure the worker's safety.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

A power source device including a battery pack according to an embodiment of the present invention will be hereinafter described with reference to FIGS. 1 to 4B.

Figure 1:
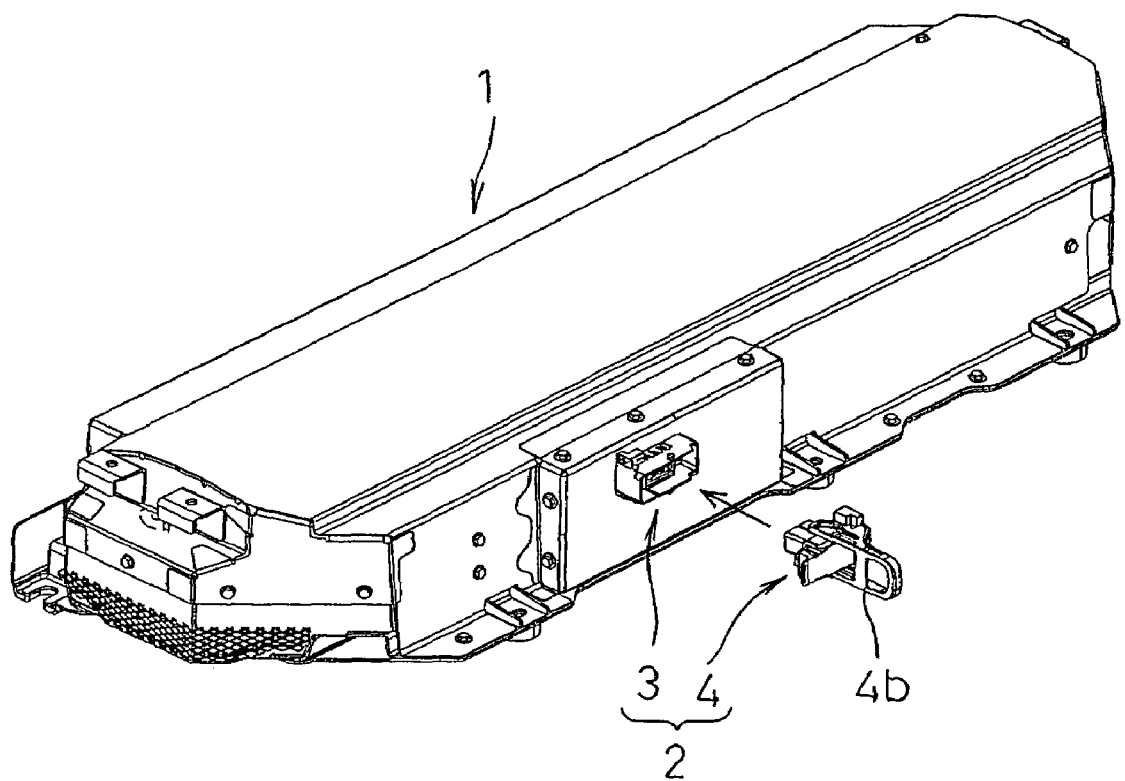
FIG. 1 is a perspective view of a battery pack in a power source device according to an embodiment of the present invention.

Referring to FIG. 1, a battery pack 1 for driving a vehicle is to be mounted on the vehicle and includes a battery assembly (not illustrated) therein. The battery assembly has a plurality of battery modules each of which includes a single cell (rechargeable battery) or a plurality of cells (rechargeable batteries) connected in series. The battery modules are arranged in parallel with a cooling path provided therebetween, and are assembled by binding end members provided at both ends of the arrangement of the battery modules, and are connected to one another in series. A path for supplying and discharging a cooling air to/from the respective cooling path between the battery modules is provided above and below the battery assembly. A charge and discharge monitoring unit (battery ECU) is provided on one side of the battery assembly. The monitoring unit includes equipment for monitoring a voltage, a current, a temperature, SOC, and the like of the battery pack. A fan is provided on another side of the battery assembly, which supplies the cooling air to the cooling air supply and discharge path.

A safety switch 2 for opening and closing a power distribution path between given battery modules connected to each other is provided at a middle portion on one side face of the battery pack 1. The safety switch 2 is formed by a switch body 3 and a safety plug 4. The power distribution path is closed by inserting the safety plug 4 and is opened by removing the safety plug 4. According to this configuration, when a worker conducts maintenance work or the like, power distribution between a general positive terminal and a general negative terminal of the battery pack 1 is cut by removing the safety plug 4 from the switch body 3. In this manner, the worker's safety against electric shock is ensured.

Figure 2A:
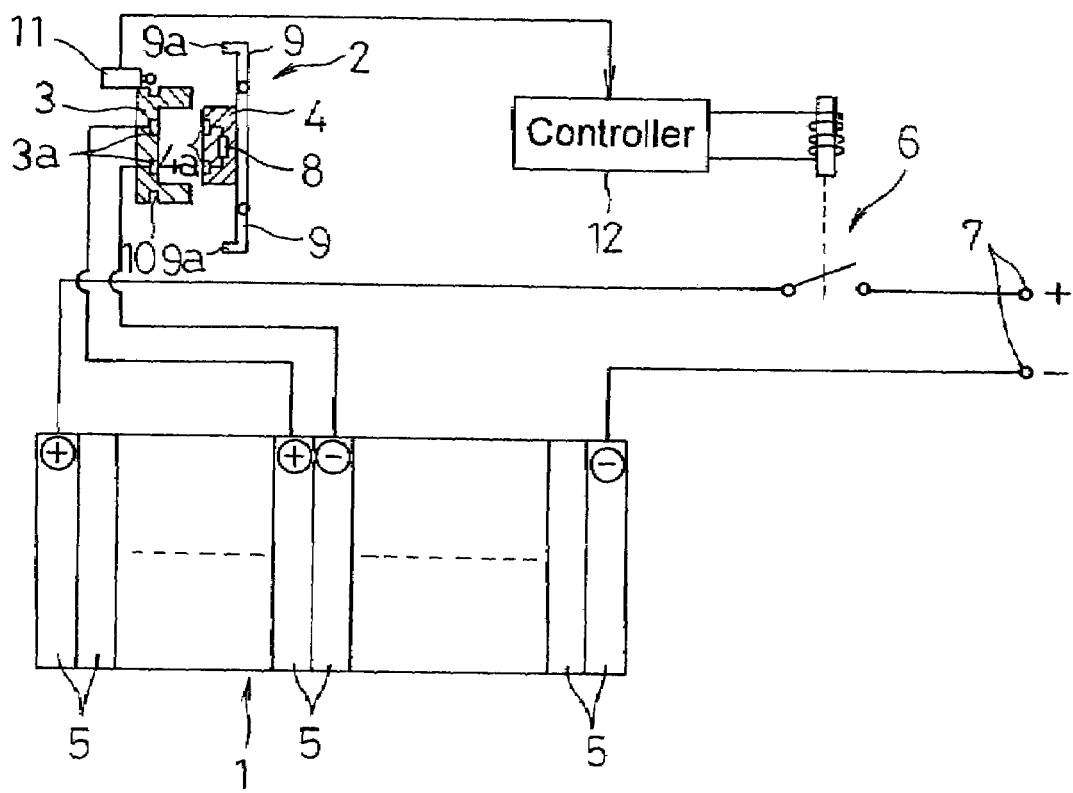
FIGS. 2A and 2B show a structure of electric connection in the battery pack of the embodiment of the present invention, FIG. 2A showing an entire structure, FIG. 2B showing a structure of a main part.
Figure 2B:
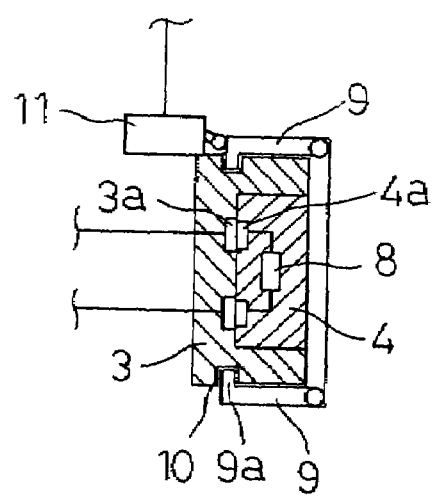

A basic structure of electric connection in the battery pack 1 is shown in FIGS. 2A and 2B. Referring to FIG. 2A, all battery modules 5 are connected in series by sequentially connecting a positive terminal of each battery module 5 to a negative terminal of its adjacent battery module 5. The general positive terminal and the general negative terminal are connected to battery modules 5 located at ends of the arrangement of the battery modules 5, respectively, and are connected to external connection terminals 7 via a main relay switch 6. Please note that a positive terminal of one of a given pair of battery modules 5 and 5 adjacent to each other, that are located at a middle portion of the arrangement of the battery modules 5, and a negative terminal of the other battery module 5 are connected to each other via the safety switch 2.

A pair of connection terminals 3a are arranged in parallel within the switch body 3 of the safety switch 2. The positive terminal and the negative terminal of the aforementioned pair of battery modules 5 and 5 are connected to the pair of connection terminals 3a, respectively. A pair of connection terminals 4a are provided on an end face of the safety switch 2 on a side to which the safety plug 4 is inserted, so as to be opposed to the connection terminals 3a, respectively. The connection terminals 4a are connected to each other via a fuse 8. That is, the safety switch 2 is arranged in such a manner that the connection terminals 3a and 3a are connected to each other via the fuse 8 when the safety plug 4 is inserted into the switch body 3 and the power distribution path is cut when the safety plug 4 is removed.

Moreover, the safety plug 4 is provided with a lock member 9. The lock member 9 locks an insertion state of the safety plug 4. This is done by performing an appropriate operation in the insertion state in which the safety plug 4 is inserted in the switch body 3 and engaging an engaging portion 9a with an engaged portion 10 formed in the switch body 3, as shown in FIG. 2B in detail. In addition, a detection switch 11 is provided that is formed by a limit switch, a reed switch or the like. The detection switch 11 is activated when the lock member 9 is locked. When the detection switch 11 is activated, a controller 12 closes the main relay switch 6.

Note that the connection terminals 3a and 4a of the safety switch 2 and the lock member 9 shown in FIGS. 2A and 2B merely represent their basic functions in an easy-to-understand manner. Specific shapes and more detailed structures should be designed to be optimum. For example, in the example shown in FIG. 1, the safety plug 4 is inserted to the switch body 3 to a certain depth and then a lever 4b is pushed down to become parallel to one side face of the battery pack 1. In this manner, the safety plug 4 is pushed into the switch body 3 by engagement with a guide groove provided in the switch body 3 and is then locked, and the detection switch 11 is activated.

Figure 3A:
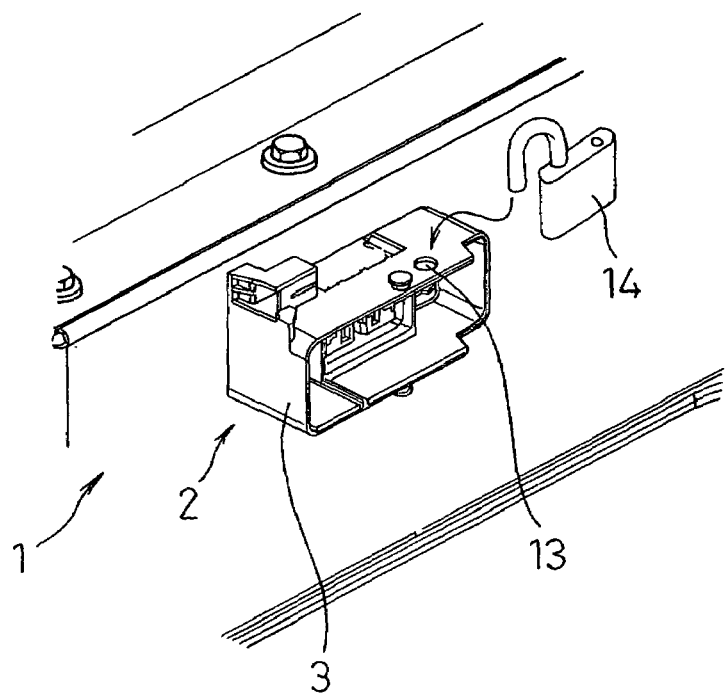
FIGS. 3A and 3B show a structure of a main part of the battery pack of the embodiment of the present invention, FIG. 3A being a perspective view showing a state in which a lock is not attached, FIG. 3B being a perspective view showing a state in which the lock is attached.
Figure 3B:
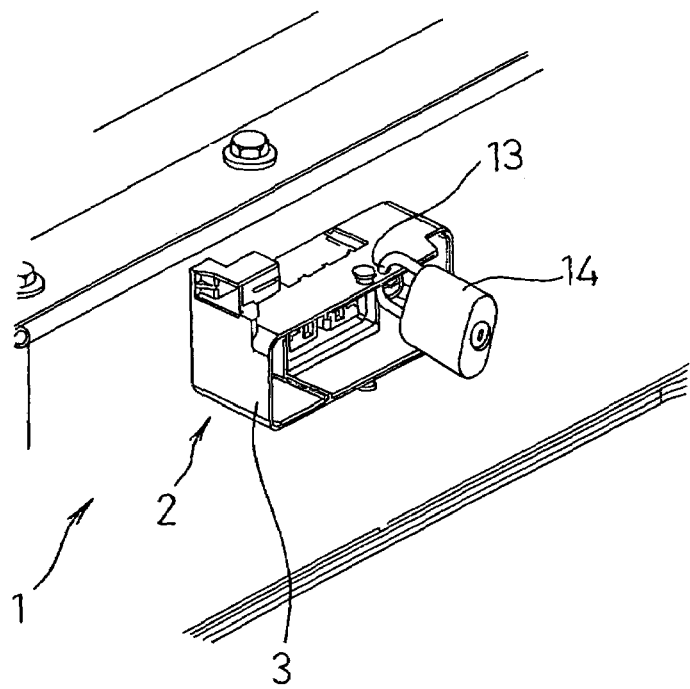

In the present embodiment, the safety switch 2 described above is arranged to include an attachment hole 13, and to allow a lock 14 (such as a padlock or a cylinder-lock) to be attached to the attachment hole 13, as shown in FIG. 3B. The attachment hole 13 is formed near an edge of an opening of a peripheral wall of the switch body 3 as shown in FIG. 3A. While the lock 14 is attached, the safety plug 4 cannot be inserted. When the lock 14 is removed, the safety switch 2 is put in a state in which insertion of the safety plug 4 is allowed. In this manner, the lock 14 serves as an insertion prevention unit for preventing the insertion of the safety plug 4 to the switch body 3 in such a manner that the prevention of the insertion of the safety plug 4 is releasable.

A key of the lock 14 or a code, such as a security code serving as a release operation unit for the insertion prevention unit, is kept by the worker. Thus, a person other than the worker or a mandator of the worker is unable to unlock the lock 14 and cannot release the insertion prevention unit for the safety plug 4. Therefore, a risk that another person mistakenly inserts the safety plug 4 while the worker is working is completely eliminated. Thus, it is possible to surely prevent the worker from getting shocked while working.

As described above, when the common lock 14 is used as the insertion prevention unit and the key or code is kept by the worker, it is possible to prevent the insertion of the safety plug 4 and ensure the worker's safety without providing a complicated insertion prevention mechanism in the switch body 3.

Figure 4A:
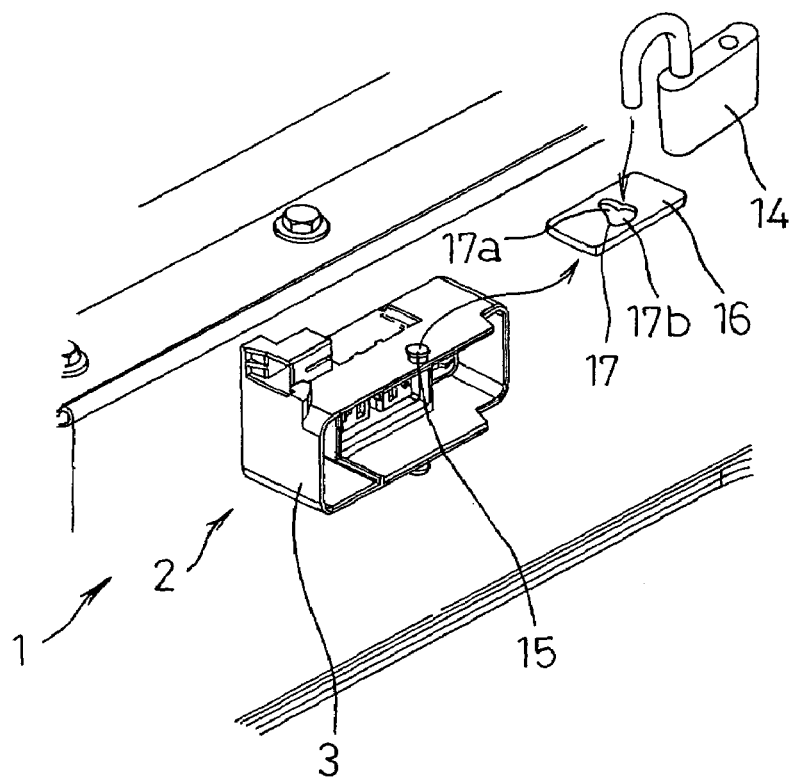
FIGS. 4A and 4B show a structure of the main part of the battery pack in one modification of the embodiment of the present invention, FIG. 4A being a perspective view showing the state in which the lock is not attached, FIG. 4B being a perspective view showing the state in which the lock is attached.

The switch body 3 of the present embodiment is provided with a projecting pin 15 on an outer surface of its peripheral wall at a position that is around a center of upper and lower surfaces of the peripheral wall and near an edge of an opening. The projecting pin 15 has an undercut portion. Thus, as a modification of the present embodiment, instead of forming the attachment hole 13, the projecting pin 15 and an attachment plate 16 may be used, as shown in FIG. 4A. The attachment plate 16 includes an elongate hole 17 formed by a small-width portion 17a that engages with the undercut portion of the projecting pin 15 and a large-width portion 17b that connects with the small-width portion 17a and serves as an attachment hole for the lock.

Figure 4B:
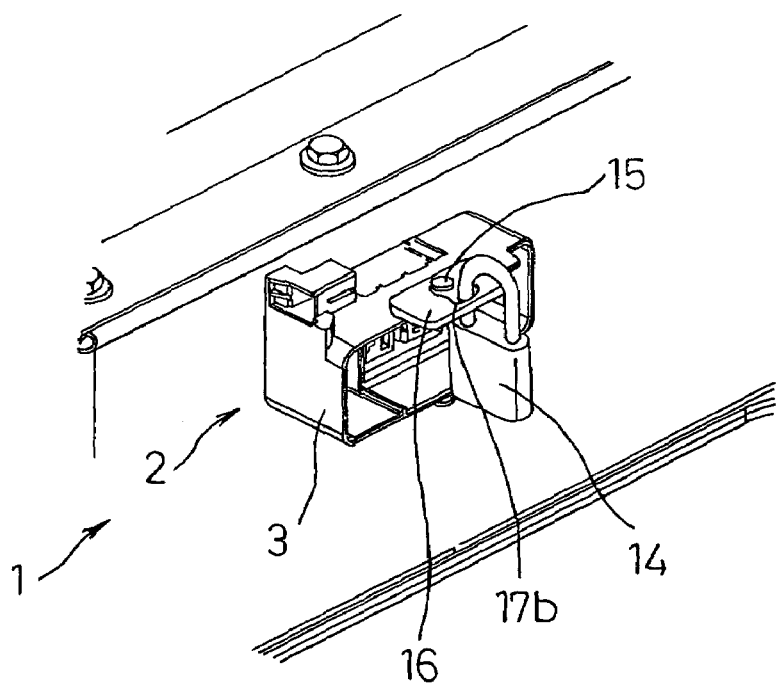

According to this structure, even if it is difficult or impossible to process the attachment hole 13 for the lock 14 in the switch body 3, the lock 14 is attached so as to prevent the insertion of the safety plug 4 and ensure the worker's safety. This is done by engaging the attachment plate 16 with the projecting pin 15 and attaching the lock 14 to the large-width portion 17b of the attachment plate 16, as shown in FIG. 4B.

As described above, according to the power source device of the present invention, the insertion prevention unit for the safety plug is activated after the worker removes the safety plug from the switch body, thereby eliminating a risk that another person mistakenly inserts the safety plug without the worker's intent. Thus, occurrence of an accident in which the worker gets shocked while working is surely prevented. Therefore, the present invention is useful to ensuring work safety in various apparatuses using a power source device including a battery pack.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A power source device comprising:
    a battery pack having a plurality of battery modules each of which includes one or more cells, the modules being connected in series;
    a safety switch, provided between given battery modules connected to each other, for connecting and disconnecting the given battery modules by insertion and removal of a safety plug to/from a switch body; and
    an insertion prevention unit for preventing the insertion of the safety plug to the switch body in such a manner that prevention of the insertion of the safety plug is releasable.

2. The power source device according to claim 1, wherein the insertion prevention unit is composed of a key that is attachable to the switch body and prevents the insertion of the safety plug when being attached to the switch body.

3. The power source device according to claim 2, wherein an attachment hole is provided in the switch body.

4. The power source device according to claim 2, further comprising:
    a projecting pin having an undercut portion provided on an outer surface of the switch body; and
    an attachment plate including an elongate hole formed by a small-width portion capable of engaging with the undercut portion of the projecting pin and a large-width portion that connects with the small-width portion and serves as the key attachment hole.

* * * * *